UNITED STATES PATENT OFFICE.

HENRY STAIER, OF BROOKLYN, NEW YORK.

MATCH COMPOSITION.

SPECIFICATION forming part of Letters Patent No. 779,674, dated January 10, 1905.

Application filed May 7, 1904. Serial No. 206,855.

*To all whom it may concern:*

Be it known that I, HENRY STAIER, a subject of the Emperor of Germany, and a resident of Brooklyn, county of Kings, and State of New York, have invented certain new and useful Improvements in Match Compositions, of which the following is a specification.

My invention relates to improvements in match compositions, and particularly to an improved composition of the character known as "non-poisonous."

Amorphous phosphorus is a chemical of the character known in the art as "non-poisonous"—that is to say, the fumes thereof are practically non-poisonous to attendants handling the same—while the fumes of yellow phosphorus, commonly employed in match composition, are very poisonous. Hitherto the use of amorphous phosphorus has been substantially confined to safety-matches, in which the amorphous phosphorus, or a preparation containing it, has been used on the prepared surface on which to strike the match, the match composition containing the potash necessary for producing ignition. Amorphous phosphorus employed in the match-head has hitherto resulted in a composition which has required so much friction to ignite as to make the matches practically valueless. I have discovered, however, that scarlet phosphorus when united in the proper proportions with chlorate of potash and other ingredients will produce a high-grade match composition which will readily ignite, which is not easily affected by dampness, and which is of a non-poisonous character.

In carrying out my invention I employ chlorate of potash, powdered sulfur, and scarlet phosphorus in the proportion of about one pound of scarlet phosphorus to .3 of a pound of powdered sulfur and 4.5 pounds of chlorate of potash. These ingredients I mix together, and also preferably mix therewith certain other material—such as plaster-of-paris, oxid of zinc, whiting, and the like, and an abradant material—such as powdered glass, sand, or the like—and a fluid binder, such as glue or gum-arabic, dissolved in water. The whole being mixed together in the proper quantities forms a high-grade match composition. The following is a formula which I have employed with successful results: glue, thirty-two pounds; chlorate of potash, ninety pounds; powdered glass, forty-two pounds; plaster-of-paris, eight pounds; oxid of zinc, eight pounds; whiting, four pounds; powdered sulfur, six pounds; scarlet phosphorus, twenty pounds. In making up the composition I first dissolve the thirty-two pounds of glue in about sixty pounds of water. Then I mix the remaining ingredients with about twenty pounds of water and finally mix the mass so formed with the dissolved glue. The twenty pounds of water employed for first dampening the dry powdered materials may be cold, while the water employed for dissolving the glue should of course be warm, and the temperature of the entire mass during mixture must be warm in order to prevent the glue from setting.

The chlorate of potash, powdered sulfur, and scarlet phsphorus in about the quantities stated together form a composition readily ignited. The plaster-of-paris, oxid of zinc, and whiting are employed as filling and binding material, while the powdered glass is added for the purpose of increasing the susceptibility of the mixture to inflammation by friction. The glue is used in this composition, as in most such compositions, for the purpose of binding the whole material together and causing it to adhere to match-splints.

It will of course be understood that the dry filling and binding material—such as the plaster-of-paris, oxid of zinc, and whiting—may be varied considerably, while still retaining the general characteristics of my composition, as also other material, such as sand, may be substituted for the powdered glass, and other materials, such as gum-arabic, may be substituted for the glue.

What I claim is—

1. The herein-described match composition, comprising a mixture of scarlet phosphorus, powdered sulfur and chlorate of potash, in about the proportion of one part of scarlet phosphorus to .3 of a part of powdered sulfur, and 4.5 parts of chlorate of potash, together with a binding material.

2. The herein-described match composition comprising a mixture of scarlet phosphorus, powdered sulfur, and chlorate of potash, in about the proportions of one part of scarlet phosphorus to .3 of a part of powdered sulfur and 4.5 parts of chlorate of potash, together with an abradant material, and sufficient glue to bind the mixture together.

3. The herein-described match composition comprising a mixture of scarlet phosphorus, powdered sulfur, and chlorate of potash, in about the proportions of one part of scarlet phosphorus to .3 of a part of powdered sulfur and 4.5 parts of chlorate of potash, together with an abradant material, binding and filling material and glue.

4. The herein-described match composition comprising a mixture of scarlet phosphorus, powdered sulfur, and chlorate of potash, in about the proportions of one part of scarlet phosphorus to .3 of a part of powdered sulfur and 4.5 parts of chlorate of potash, together with an abradant material, a relatively small quantity of plaster-of-paris, oxid of zinc, and whiting, and sufficient glue to properly bind the material together.

5. The herein-described match composition, comprising a mixture of scarlet phosphorus, powdered sulfur, chlorate of potash, an abradant material, plaster-of-paris, oxid of zinc, whiting and a binding material, combined together in substantially the proportions above set forth.

6. The herein-described match composition comprising the following ingredients, in about the proportions stated: Twenty parts (by weight) of scarlet phosphorus, six parts powdered sulfur, ninety parts chlorate of potash, forty-two parts powdered glass, eight parts plaster-of-paris, eight parts oxid of zinc, four parts whiting, and thirty-two parts glue, substantially as described.

In witness whereof I have hereunto set my hand this 6th day of May, 1904.

HENRY STAIER.

Witnesses:
D. HOWARD HAYWOOD,
C. L. HALL.